G. F. ROBBINS.
UNIVERSAL IRON WORKING MACHINE.
APPLICATION FILED JULY 27, 1918.
1,303,394.
Patented May 13, 1919.
2 SHEETS—SHEET 1.
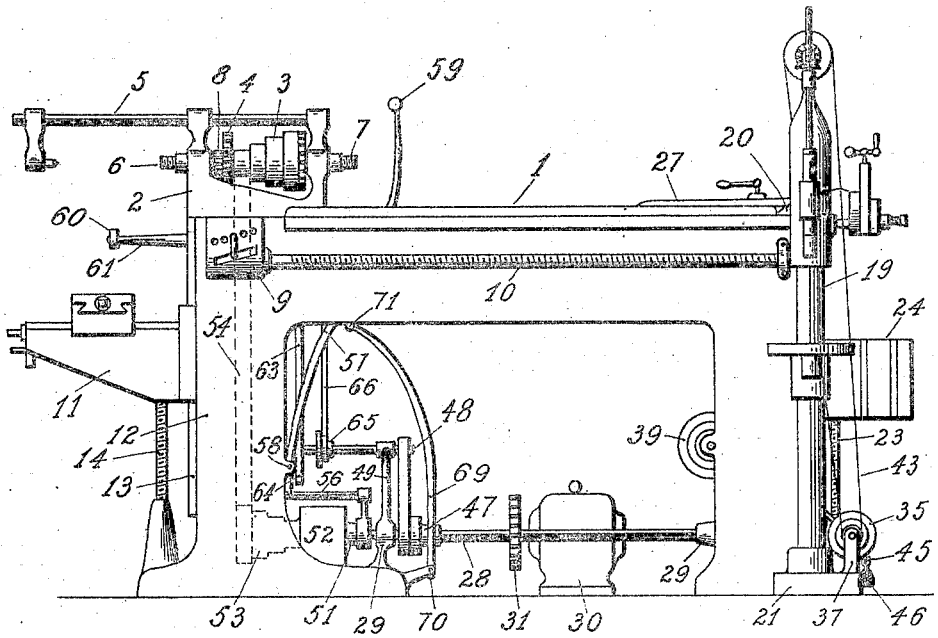
Fig. I.
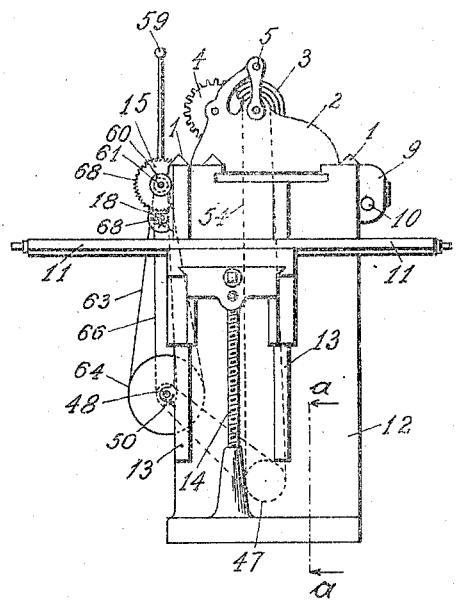
Fig. II.
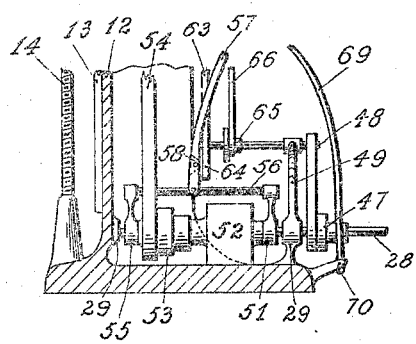
Fig. III.
INVENTOR
Guy Franklin Robbins.
BY C. S. Goldberg.
ATTORNEY

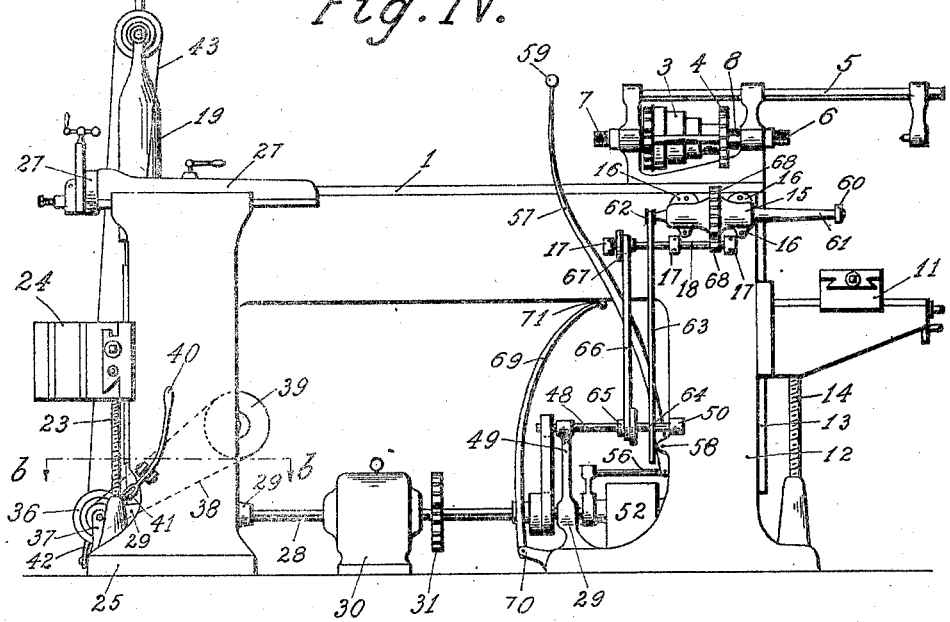

UNITED STATES PATENT OFFICE.

GUY FRANKLIN ROBBINS, OF PORTLAND, OREGON.

UNIVERSAL IRON-WORKING MACHINE.

1,303,394.   Specification of Letters Patent.   Patented May 13, 1919.

Application filed July 27, 1918. Serial No. 246,978.

*To all whom it may concern:*

Be it known that I, GUY FRANKLIN ROBBINS, a citizen of the United States, residing at Portland, in the county of Multnomah and State of Oregon, have invented a new and useful Universal Iron-Working Machine, of which the following is a specification.

My invention relates to improvements in iron working machines in which one integral apparatus is adapted to perform the work of a lathe, milling machine, drill press, shaper, and cylinder and surface grinder; and the objects of my invention are:

First, to construct a head stock for a lathe which also may serve as a head stock for a milling machine.

Second, to use the head end of a lathe as a milling machine and a cylinder and surface grinder.

Third, to build out the tail end of a lathe so that it may serve as a drill press and a shaper.

Fourth, to construct a lathe stand which may accommodate the driving shaft and other mechanism for my machine.

Fifth, to have every operation controlled individually by a friction clutch.

Sixth, to provide a machine which will not occupy much more room than a lathe, and therefore be excellently adapted to places where floor space is limited, such as tool rooms, garages, steam boats, small cruisers, roundhouses, etc., and whose compactness permits it to be stationed on motor trucks and used as an emergency tool in the field.

Seventh, to provide a machine which is not much more expensive than a lathe yet will give universal service to the metal worker.

Eight, to provide a machine which, due to its compactness, will permit, either one workman to keep a watchful eye on several operations or else, several workmen to perform individual operations without seriously interfering with each other.

I attain these objects by the mechanism illustrated in the accompanying drawings in which,—

Figure I is a front view of my machine considering same as a lathe; Fig. II is an end view of the head end showing the table for the milling machine and for the cylinder and surface grinder; Fig. III, a section through Fig. II taken along the line *a—a*, showing the arrangement of the driving mechanism for the various machines at the head end; Fig. IV may be designated as the rear of the lathe, showing to advantage the shaper and the cylinder and surface grinder; Fig. V is an end view of the tail end, showing especially the drill press and the shaper; Fig. VI, a section taken along the line *b—b* in Fig. IV, with particular reference to the driving mechanism for the machines located at this end.

Similar numerals refer to similar parts throughout the several views.

The central part of my machine is occupied by a lathe with a bed 1, on which is located the head stock 2 with step cone 3 and back gear 4 as on every other lathe. (The carriage and tail stock form no part of my invention and are omitted in the drawings). But in addition there is, surmounting the step cone, an over arm 5, adapted to support the arbor of a milling cutter which latter can be attached to the opposite end 6 of the lathe spindle 7, the spindle for this purpose being made hollow and having threads, inside tapers and thrust bearings at both ends. Thus the same spindle and driving mechanism will serve the lathe and the milling machine. Another novel feature consists in the gear 8, which connects with the quick change gear 9 and the lead screw 10, being located within the head stock 2, thereby leaving the place on the outside of the bearing unincumbered for the full use of the milling machine.

To attach the milling table 11, the lathe stand 12 carries vertical ways 13 on which the milling table slides, propelled by the vertical screw 14. The same table serves the cylinder and surface grinder 15 though the driving mechanism for latter is separate.

To connect by means of a knuckle shaft, gears or other devices the lead screw 10 with the milling table 11 and to furnish thereby an automatic feed for the milling machine, is a matter of mere mechanical skill and needs no further elaboration.

As will be noticed in Fig. II the center line of the milling table does not coincide with the center line of the lathe, but is offset toward the cylinder and surface grinder 15; this is done in order to afford both dependent machines a maximum working range on the table 11.

The cylinder and surface grinder 15 may be of the usual construction and will be mentioned more in detail hereafter. At present suffice it to say that proper care for the attachment of the grinder 15 to the lathe are made by, first, providing spot faces with stud bolts for the grinder bases 16 and for the bearing bases 17 of the pinion shaft 18, second, by leaving recesses where gears or pulleys require clearance.

At the tail end of the lathe we notice the drill press 19 which has no unusual features except that of being attached to the lathe bed 1 at the point 20 and resting on a base 21 which forms part of the lathe stand.

The shaper also is of standard construction, except that the lathe stand 22 forms one of the four sides of the shaper column box, as shown in Fig. VI, and that the vertical screw 23 for the shaper table 24 rests on the extended base 25 of the lathe stand 22. The numeral 26 in Fig. VI indicates the vertical lever within the shaper column actuating in the customary manner the ram 27.

The driving mechanism for all the various machines is located within the lathe stand, thus making my machine practically self contained. A horizontal shaft 28, supported in suitable bearings 29 on the base of my machine, is driven in any suitable manner, (an electric motor 30 and gears 31 are shown in this instance). At the tail end this shaft 28 carries a bevel gear 32 which meshes with another bevel gear 33 on a shaft 34 running at right angles to the main shaft 28. This shaft 34 carries the two step cones 35 and 36 for the drill press and the shaper and is supported in suitable bearings 37. Fig. V illustrates the manner in which the belt 38 leads to the step cone 39 which drives the shaper, and how operation is controlled by means of a hand lever 40, link 41 and friction clutch 42. The same figure also shows the belt connection 43 to the drill press 19 and the friction clutch 44 controlled by link 45 and foot lever 46.

Toward the head end of the main shaft 28 we observe in following order: the friction clutch 47 which controls the counter shaft 48 to the cylinder and surface grinder 15; then comes a bearing 29 for the main shaft, which also, by means of a curved arm 49 extending backward and upward, takes in the counter shaft 48, (the other end of this shaft 48 is supported in a bearing 50, Fig. IV, attached directly to the lathe stand); next in order we have a friction clutch 51 for the reverse gear of the lathe, the gear box 52 containing said reverse gear, a step cone 53 with the belt 54 to the head stock 2, and lastly, the friction clutch 55 for the forward motion of the lathe. Both these last named friction clutches are connected by a rod 56 and operated by a hand lever 57 whose fulcrum is in a pivotal shaft 58 with bearings in the lathe stand. This hand lever 57 extends rearward and upward and terminates at 59 where the lathe operator can most conveniently lay his hands on. By means of this hand lever the operator can start, stop or reverse the lathe as well as the milling machine.

The cylinder and surface grinder is of typical construction. Its driving mechanism can best be explained by means of Fig. IV.

For surface grinding, the emery wheel 60 on the spindle 61 is driven rapidly by a pulley 62 and this again by belt 63 and pulley 64 from the counter shaft 48.

For cylinder grinding, the secondary rotation of the spindle 61, after the latter has been set at the proper eccentricity within its housing, is furnished by the step cone 65 on the counter shaft 48 thence through a belt 66 to the step cone 67 on the pinion shaft 18 and, through the gears 68, to the spindle 61. The spindle can be withdrawn in case it should interfere with operations on the milling machine.

The hand lever 69, for the friction clutch 47 on the main shaft 28, which controls the rotation of the cylinder and surface grinder, is attached to the base of the lathe at 70 and projects upward to a place 71 where the operator of the grinder can handle it most conveniently.

Having fully described my invention, it will be seen that my objects have been accomplished, and though I have shown the preferred form of my machine, I reserve to myself the right to make minor changes in construction so long as I do not violate the principle of my invention.

I claim:

1. In a universal iron working machine, the combination of means for turning, milling, cylinder and surface grinding, shaping and drilling combined in one single machine so that there is a minimum of interference in simultaneous operation, said means comprising a lathe with a head stock, a miller at the head end, common driving gear in the head stock for lathe and miller, a grinder alongside the miller, a common work table for both miller and grinder, driving gear for the grinder for both cylinder and surface grinding, a shaper at the tail end, driving gear attached to said shaper, a drill press at the tail end, driving gear attached to said drill press, with a common support for all said means, and a common driving mechanism within the support adapted to operate said means either individually, or collectively.

2. In a universal iron working machine, the combination of means for turning, milling, cylinder and surface grinding, shaping and drilling, comprising a lathe bed at the center, a miller and cylinder and surface grinder at the head end, and a shaper and a drill press at the tail end, with a common support for all said means, and a common driving mechanism within the support adapted to operate said means either individually or collectively.

3. In a universal iron working machine, the combination of means for turning, milling, grinding, shaping and drilling comprising a lathe bed, a head stock on the bed, said head stock turning and milling simultaneously, a grinder at the head end but rearwardly of the lathe bed, a milling table adjustably secured to the head end below the miller and grinder, a shaper and a drill press at the tail end, with a common support for all said means, and a common driving mechanism within the support adapted to operate said means either individually or collectively.

4. In a universal iron working machine, the combination of means for turning, milling, grinding, shaping and drilling comprising a lathe bed with a head stock, a miller at the head end, an adjustable table at the head end for both miller and grinder, a shaper at the tail end but rearwardly of the lathe bed, a drill press at the tail end but in front of the lathe bed, with a common support for all said means, and a common driving mechanism within the support adapted to operate said means either individually or collectively.

5. In a universal iron working machine, the combination of means for turning, milling, cylinder and surface grinding, shaping and drilling arranged to operate with a minimum of mutual interference, said means comprising a lathe and a miller having a common driving gear, a grinder alongside the miller having a driving gear for cylinder and surface grinding, a shaper at the tail end having a driving gear attached to said shaper, a drill press at the tail end having a driving gear attached to said drill press, with a common support for all said means, and a common driving mechanism within the support comprising, a main shaft having driving pulleys and belts to said turning, milling, and cylinder and surface grinding means, a cross shaft operatively connected with the main shaft, said cross shaft having driving pulleys and belts to said shaping and drilling means, and clutches on both shafts to operate said turning, milling, cylinder and surface grinding, shaping and drilling means either individually or collectively.

GUY FRANKLIN ROBBINS.

Copies of this patent may be obtained for five cents each, by addressing the "Commissioner of Patents, Washington, D. C."